United States Patent [19]

Conn

[11] 4,317,289

[45] Mar. 2, 1982

[54] PIVOTED TWO-SECTION CARPENTER'S LEVEL

[75] Inventor: Bartley R. Conn, Auburn, Calif.

[73] Assignee: U. D. P., Inc., Incline Village, Nev.

[21] Appl. No.: 122,736

[22] Filed: Feb. 19, 1980

Related U.S. Application Data

[63] Continuation-in-part of Ser. No. 31,464, Apr. 19, 1979, abandoned.

[51] Int. Cl.³ ............................................. B43L 7/06
[52] U.S. Cl. ........................................ 33/498; 33/451
[58] Field of Search ................ 33/418, 451, 422, 423, 33/425, 458, 465, 471, 478, 403, 495–500, 161; 16/189

[56] References Cited

U.S. PATENT DOCUMENTS

| | | | |
|---|---|---|---|
| 436,495 | 9/1890 | Fox | 33/381 |
| 732,827 | 7/1903 | Chambers | 33/465 |
| 847,963 | 3/1907 | Milhollin | 16/189 |
| 882,289 | 3/1908 | Bommer | 16/189 |
| 942,583 | 12/1909 | Neeld | 33/495 |
| 1,014,402 | 1/1912 | Larsen | 33/451 |
| 1,021,692 | 3/1912 | McAnelly | 33/27 C |
| 1,210,370 | 12/1916 | Dvorak | 33/382 X |
| 1,359,758 | 11/1920 | Slavik | 33/495 X |
| 1,462,430 | 7/1923 | Vogel | 33/383 |
| 2,559,961 | 7/1951 | Howell | 33/458 X |
| 2,748,494 | 6/1956 | Raney | 33/383 |
| 2,853,924 | 9/1958 | Herzfeld et al. | 16/180 X |
| 2,878,569 | 3/1959 | Metrulis | 33/451 |

FOREIGN PATENT DOCUMENTS

| | | | |
|---|---|---|---|
| 347879 | 1/1922 | Fed. Rep. of Germany | 33/27 B |
| 712091 | 7/1954 | United Kingdom | 33/465 |
| 1182857 | 3/1970 | United Kingdom | 33/465 |

*Primary Examiner*—Harry N. Haroian
*Attorney, Agent, or Firm*—Owen, Wickersham & Erickson

[57] ABSTRACT

A carpenter's level is formed in two sections, connected together by a pivot near the top of the sections whereby the level may be adjusted to various positions including at least a straight, linearly aligned position and a right angle position. When in the linear configuration, the surfaces of two cooperating sections are flush, without protrusions. A pair of extending flanges on the main section overlap the other, adjustable section by extending into complementarily shaped recesses in the sides of the adjustable section, and the adjustable section includes a projecting insert which extends into a recess formed in the main section, so that the flanges, recesses and insert cooperate to provide stability and alignment of the two sections. Position-holding projections on the inside surfaces of the extending flanges are engageable with sets of depressions formed in the recesses of the adjustable section, positioned to hold the two level sections at selected angles. The sections are spring-biased toward the linearly aligned position, preferably by a coiled torsion spring positioned over the pivot pin, and the level may be easily returned from any angle to the linear position by a snapping motion from the hand of the operator. A level bubble is provided in at least the main section, which is usually used horizontally, and preferably also in the adjustable section for each of the selectable positions. In the right angle position, the adjustable level may be used as a corner squaring tool, and its open corner will fit over most moldings. The level bubbles are retained in U-shaped recesses provided in the level sections by special retaining brackets adhered to the U-shaped recesses after the level bubbles are inserted.

5 Claims, 6 Drawing Figures

U.S. Patent  Mar. 2, 1982  4,317,289
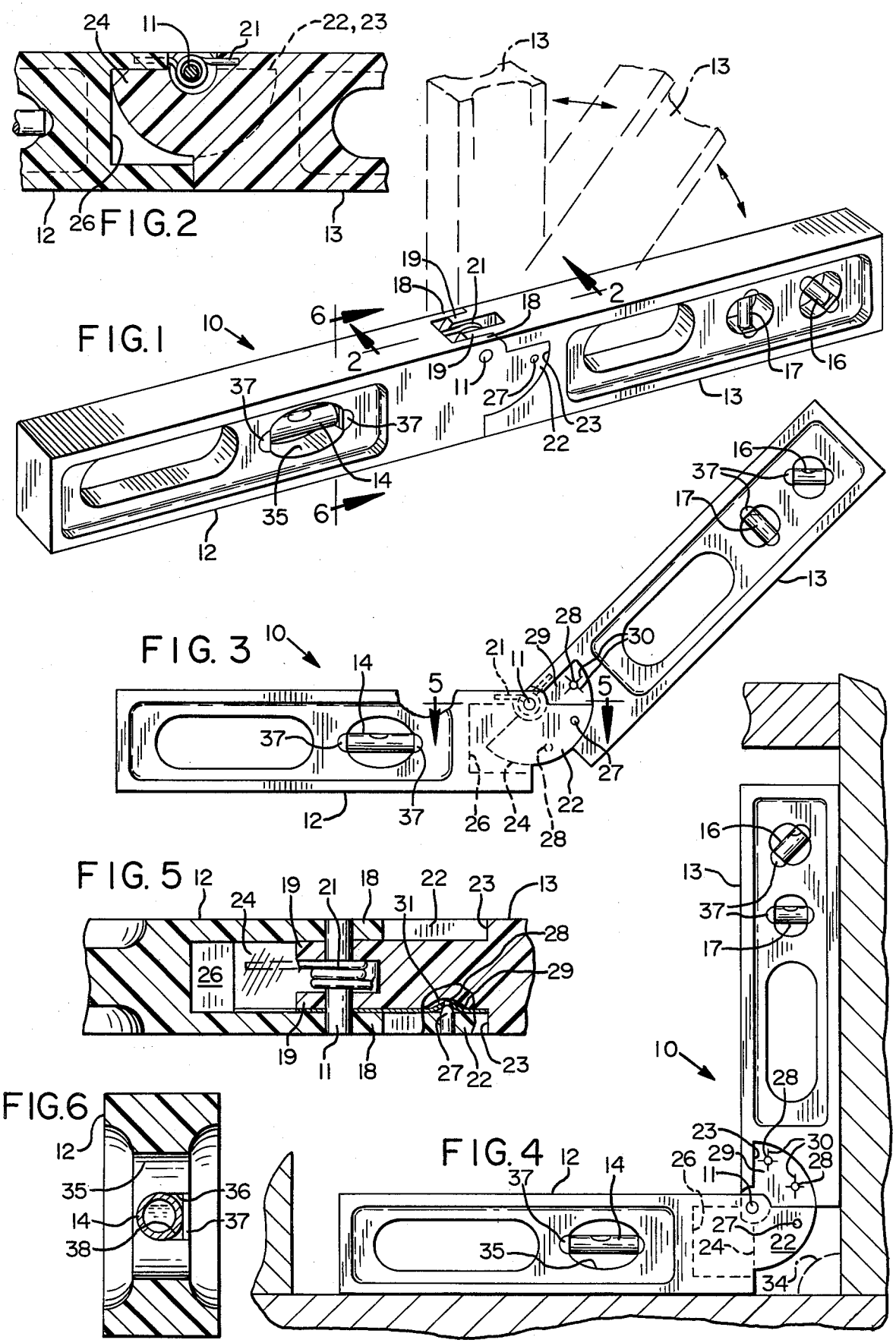

PIVOTED TWO-SECTION CARPENTER'S LEVEL

REFERENCE TO RELATED APPLICATION

This application is a continuation-in-part of application Ser. No. 31,464, filed Apr. 19, 1979, now abandoned.

BACKGROUND OF THE INVENTION

The invention relates to leveling tools, and more particularly to a pivoting, two-section adjustable carpenter's level which is also useful as a squaring tool.

Carpenter's tools usually include a level and a square, which are frequently used in conjunction with one another. Accordingly, there has been a need for a combination tool useful for both squaring and leveling, and which can be used conveniently and efficiently.

The concept of a hinged, two-part level is not new. See, for example, Shelley U.S. Pat. No. 120,675, Chambers U.S. Pat. No. 732,827, Larsen U.S. Pat. No. 1,014,402, Laggren U.S. Pat. No. 2,728,989 and Metrulis U.S. Pat. No. 2,878,569. These patents show pairs of level components pivoted together at their adjacent ends, with various arrangements as to positions available, some of them including adjustable sections with 90° and 45° level bubbles, and usually including some form of holding or locking means for maintaining the selected position while the tool is being used in that position. Most of the devices shown in these references also are capable of functioning as squaring tools.

Other prior patents showing multiple-section tools which may be used as levels, squares, or for fold-up storage include U.S. Pat. Nos. 1,210,370, 1,806,396, 2,454,133, 3,783,518 and 3,934,351.

While these previous patents, particularly the earlier mentioned patents, disclosed multiple-component pivoted tools having squaring and leveling functions providing some utility, no previous device was as versatile, efficiently operated, sturdy and reliable, yet as simple in construction as the present invention described below.

SUMMARY OF THE INVENTION

The present invention is an improved pivoting level having two components preferably pivoted together at or near their top sides and capable of being retained in selected positions by means of flanges on one section and cooperating recesses on the other, with inward projections on the flanges engageable in detents or depressions in the recesses of the other section. A spring is also preferably included to urge the two sections toward the straight position with the sections linearly aligned. When the adjustable section is pivoted away from its aligned position with the main section, the positionholding arrangement is automatically engaged at each selectable position but may easily be bypassed to another desired position without any manipulation of locking or releasing apparatus.

The two sections are held together by a pivot pin passing through cooperating and overlapping short flanges near the top of the level, and a torsion spring is preferably coiled around the pivot pin and engaged with each section so as to urge the sections toward linear alignment. The spring is preferably of such spring constant and winding that a not significantly greater urging force results when the sections are in the 90° position than when they are in the aligned position. The engagement between the inwardly extending projections of the flanges, which may be small metal members seated or embedded in the inside faces of the projections, and the depressions provided in the other level section are strong enough to maintain the selected angular positions, but the somewhat rounded configuration of the projections and the depressions provides for moving of the level from one position to another without a great deal of force required. The recesses in the adjustable level section, and the projecting insert extending therefrom as a generally coplanar, continuous extension of the recessed areas, may have a face plate on one or both sides, preferably of spring steel, providing the detents or depressions for the position holding arrangement. No special springs need be used to urge the rounded projections of the flanges toward the detents, since the extending flanges themselves act as springs; when the sections are moved from one of the selected positions, the flanges are springingly forced outwardly, and they tend to urge the projections into the detents at each position. To provide additional springing action and to urge the projections and detents together in each position, the face plates may be mounted with small clearances between the face plate and the underlying structure in the vicinity of each detent or depression, so that the face plate can yield when required and maintain an outward pushing action against the rounded projections.

The main section of the adjustable level includes a leveling bubble for the horizontal position. This is sufficient for use in many situations, since the adjustable section will be positioned at a known angle from the main section, selected by the user. However, additional leveling bubbles are preferably included in the adjustable section, representing each of the selectable positions other than the straight position. This provides a vertical plumb level bubble for use either in the right angle position or in a straight position when the tool is used vertically, and it also aids in several other situations.

In addition to the right-angle position, the position holding arrangement preferably includes a 45° position, with a depression appropriately located for registry with the rounded projection at each side of the level at this position. A 45° angle leveling bubble may be provided in the adjustable section for use in this position.

One feature of the invention is an improved, efficient manner of retaining the level bubbles in the level sections. At the opening where each level bubble is provided, U-shaped recesses are formed at each end of the opening, sized to receive the cylindrical casing of the level bubble, so that the casing is inserted from one side and its ends are received by the recesses. Level bubble retaining brackets are then inserted into each of the U-shaped recesses to engage the ends of the casing, and secured thereto preferably by adhesion. The level bubble casing itself may also be adhered to both the U-shaped recess and the retaining bracket, and the result is a secure and unobtrusive appearing arrangement.

One advantage of the adjustable level of the present invention is that it may be used as a conventional level or quickly moved to the right-angle position still in a conventional way but in a narrow space where the full-length level would not fit in the horizontal or in the vertical orientation.

Another advantage is that, in the right-angle position, the device may be used as a leveling and squaring tool over most moldings, as at a base board or ceiling molding.

Another important advantage is that, with the inclusion of the spring biasing the two sections toward the position of alignment, the level may be quickly and easily returned from the 90° position or the 45° position to the aligned position simply by a quick movement by the hand of the user. The position holding structure enables this to be done without the release of any fasteners, locking devices, etc.

It is therefore among the objects of the invention to provide an improved two-section adjustable carpenter's level including a pair of straight sections similar in dimensions of height and width, namely a main section and an adjustable section, with pivoting means connecting the sections together flushly and providing for pivoting movement of the adjustable section with respect to the main section, from a position of linear alignment of the two sections through at least 90°. At least the main section has a level bubble, indicating horizontal position. A pair of flanges extend lengthwise from one section, flush with the sides of the section and overlapping the other section, with corresponding side recesses positioned in the other section to receive the extending flanges. A projecting insert extends from the other section centrally into the one section, with a corresponding recess positioned in the end of the one section to receive the insert, the insert generally forming an extension of the width of the other section at the side recesses with continuity of the walls thereof, and the flanges, recesses and insert cooperate to provide stability and alignment of the two sections. The level further includes a position holding means associated with the flanges, the side recesses and the insert for holding the sections at selected angles, including a right-angle position.

DESCRIPTION OF THE DRAWINGS

FIG. 1 is a perspective view of a carpenter's level formed in two sections according to the invention.

FIG. 2 is a partial view in section of the level, taken along the line 2—2 of FIG. 1.

FIG. 3 is a side elevation view of the level, set at a 45° position.

FIG. 4 is a side elevational view of the level, set at a right-angle position and positioned in a corner which may have a floor molding.

FIG. 5 is a sectional plan view of the level, taken along the line 5—5 of FIG. 3.

FIG. 6 is a sectional view taken along the line 6—6 of FIG. 1, showing the manner in which the level bubbles are secured in the leveling tool.

DESCRIPTION OF A PREFERRED EMBODIMENT

In the drawings, FIG. 1 shows a two-section pivoting carpenter's level 10 according to the invention, having a pivot pin 11 connecting a main section 12 and an adjustable section 13. The main section 12 includes a level bubble 14, typical of carpenter's levels, and additional level bubbles 16 and 17 may be provided in the adjustable section 13 for the 45° and the right-angle positions of the adjustable section, respectively. By 45° angle position it is meant the position shown in FIG. 3, although this might more properly be described as a 135° angle position.

The pivot pin 11, as best seen in FIGS. 1, 2, 3 and 5, preferably is arranged as shown, passing through overlapping flanges 18 and 19 of the main section and the adjustable section, respectively, so that there are no protrusions from the level at either side or top, and the surfaces remain flush. There is preferably included a torsion spring 21 positioned around the pivot pin 11 as shown, and engaged with each of these sections 12 and 13 as shown, and providing a constant urging force tending to return the pivoted level 10 to the position of linear alignment. Of course, other arrangements for the pivoting of the sections and for the spring may be employed, but the illustrated arrangement is preferred because it is simple and it enables the maintenance of flush surfaces.

A pair of projecting flanges 22 extend from the end of the main section 12 toward and in overlapping relationship with the adjustable section 13. These may be approximately quartercircular, as illustrated. Cooperating side recesses 23 in the adjacent end of the adjustable section 13 are complementarily shaped and dimensioned for a relatively close fit with the flanges 22. The sides of these recesses 23 extend longitudinally to form a projecting insert 24 which extends beyond the remainder of the adjustable section 13 and into a recess 26 provided in the main section, as illustrated particularly in FIGS. 2, 3 and 5. As seen in the drawing, the recesses 23 and insert 24 may form a semicircular shape, which is appropriate because of the type of relative motion between the two sections 12 and 13 as they are pivoted between the linear position and a 90° position. The complementary shaping of the flanges, recesses and insert of the two sections, and their close spacing, provides for rigidity of the level in its aligned position, and a high degree of stability in all positions, so that the level has the feel and dependability of a one-piece rigid tool.

Another purpose of the cooperating flange and recess arrangement is the provision of a position holding means, which in this preferred embodiment comprises a rounded-end projection 27 extending inwardly from one or both of the flanges 22, and cooperating detents or depressions 28 at corresponding locations for each of the selectable positions of the level. The detents or depressions 28 may be formed in the wall of the recess 23 itself, or in a face plate such as the spring steel face plate 29 shown in the drawing. Such a face plate 29 is approximately semicircular, overlying one or both sides of the adjustable section 13, coextensive with the recess 23 and the adjacent projecting insert 24. As illustrated, the detents 28 may comprise small holes through the spring steel face plate 29, and the face plate may be split radially around the holes to aid in springing, as shown at 30. So that a continuous springing force is exerted by the face plate 29 against the projection 27 at each side, there may be provided a clearance 31 between the face plate 29 and the underlying adjustable section structure, as illustrated in FIG. 5. Thus, when the projection 27 approaches one of the depressions 28, the face plate 29 springs inwardly slightly, but with the outward springing force exerted on the rounded projection 27. When the projection enters the depression, the face plate 29 springs outwardly at that location and tends to hold the projection in the depression so that the tool remains in the selected angular position. In addition, the flanges 22 extending from the main section may be somewhat resilient so that they also provide a springing effect 10 tending to maintain the projection 27 in the depression 28 of the selected position.

As illustrated in FIG. 5, the projection 27 may take the form of a pin of steel or other material, seated in a bore through the flange 22, as shown. However, any suitable arrangement for providing a projection 27 may be used, and the structure of the flange itself may provide the projection, formed in the molding process.

Various positions of the level 10 are shown in the drawing. The two sections may be engageable in other angular positions for particular application if desired, simply by providing the appropriate detents or depressions 28. In the straight, linear position the level 10 may be used to check level of horizontal members, via the level bubble 14, or to check plumb of vertical members, via the level bubble 17. Because of the use of the preferred type pivoting arrangement shown, whereby there are no protrusions on either the top or the bottom edge of the level when in the straight position, horizontal members may be checked with the level in either upright or inverted position. Similarly, vertical members may be checked with the straight level in vertical position, with either edge held against the member, and with the level bubble 17 oriented either up or down. The leveling devices 14, 16, and 17 are preferably of the type which are readable upside down, as well as in the normal position.

FIG. 3 shows that, in the 45° position, the level 10 is useful for properly orienting a 45° member with respect to the horizontal. The proper orientation of such a member can be referenced from the main section's level bubble 14, or from the level bubble 16, oriented for 45° angles. Sometimes the user will be in a position to view one of the level bubbles better than the other.

FIG. 4 shows the level 10 in the right-angle position, used as a square to assure a 90° angle between two members, and also as a leveling and plumbing device, via the level bubbles 14 and 17. FIG. 4 demonstrates several important features. One is that the level 10 in the right-angle position will fit over a floor molding 34 or other such corner installations, such as nail heads, etc. Another advantage is that the level 10 may be pivoted to the 90° position simply to fit into a narrow space for either horizontal or vertical use. The construction illustrated in FIG. 4 would not permit the full height and length of the straight level to be used for either horizontal or vertical work, but in the right-angle position it is shorter in both directions and may be applied to either type use.

FIG. 6 illustrates another feature of the invention, whereby the level bubbles 14, 16 and 17 are retained in place securely and efficiently, without elaborate structure. At each end of an opening 35 provided for each level bubble, there is a generally U-shaped recess 36 formed. The level bubble 14, 16, or 17, with its cylindrical casing is inserted into the opening 35 with its two ends extending into the U-shaped recesses 36. Once the level bubble has been inserted, special brackets 37 are inserted into each of the U-shaped recesses from the same side that the level bubble was inserted. The level bubble retaining brackets 37 may be shaped as shown in FIGS. 3, 4 and 6, fitting into the ends of the recesses 36 at that side of the level. This engages the side of the level bubble casing, as indicated, and the special bracket 37 is then secured to the U-shaped recess as by gluing. In addition, the level bubble may be adhered to the U-shaped recess and to the recess 38 of the bracket 37 by gluing, to prevent rotation.

The above described preferred embodiment provides a pivoted, two-section level which is versatile in many applications, yet simple and economical in construction. Various other embodiments and variations to this preferred embodiment will be apparent to those skilled in the art and may be made without departing from the spirit and scope of the invention as defined by the following claims.

I claim:

1. An adjustable carpenter's level, comprising:
    a pair of straight sections similar in dimensions of height and width, including a main section and an adjustable section;
    pivoting means connecting the sections together flushly and providing for pivoting movement of the adjustable section with respect to the main section, from a position of linear alignment of the two sections through at least 90°;
    a level bubble in at least the main section, indicating horizontal position;
    a pair of flanges extending lengthwise from one section, flush with the sides of said one section and overlapping the other section, and corresponding side recesses in the other section to receive the extending flanges;
    a projecting insert extending from said other section centrally into said one section, with a corresponding recess positioned in the end of the one section to receive the insert, said insert generally comprising an extension of the width of said other section at the side recesses, said flanges, recesses, and insert cooperating to provide stability and alignment of the two sections; and
    position holding means associated with the flanges, the side recesses and the insert for holding the sections at selected angles, including a right-angle position, comprising a projection extending from the inside face of at least one of the flanges, inwardly toward the projecting insert and side recess of the other section, said insert and side recess having depressions for receiving and seating the projections at said selected angles, and including means urging the projection into the depressions.

2. The adjustable level of claim 1, wherein the urging means comprises the resilience of the flanges, which yield slightly when the projection is moved out of a depression.

3. The adjustable level of claim 1, wherein a metal face plate is included on the projecting insert and the side recess on the side adjacent to the projection, said depressions being in the metal face plate.

4. The adjustable level of claim 3, wherein a small clearance is provided between the face plate and the body of the projecting insert or side recess in the area of each depression, so that the face plate acts as a spring applying outward pressure against the rounded projection.

5. The adjustable level of claim 3, wherein the metal face plate is of spring steel, and the depressions have openings, the spring steel being split radially around the openings.

* * * * *